United States Patent Office 2,715,117
Patented Aug. 9, 1955

2,715,117

METHODS OF BULK POLYMERIZATION

Alfred Eugène Marius Baeyaert, Brou, France, assignor to Societe Anonyme des Manufactures des Glaces et Produits Chimiques de Saint-Gobain Chauny & Cirey, Paris, France No Drawing. Application March 10, 1953,
Serial No. 341,609

7 Claims. (Cl. 260—92.8)

This invention relates to the manufacture of thermoplasts. It has general relation to the polymerization of unsaturated organic compounds having a polymerizable group of the halogeno ethylene type, the polymers and copolymers of which are insoluble in their monomer. It is specifically related to the manufacture of thermoplasts from vinyl and vinylidene halides of which vinyl chloride, vinylidene chloride fluoroethylene and chloro fluoroethylene are the most useful. The invention includes copolymers and interpolymers of such compounds.

There are several methods of making such thermoplasts, of which the method by polymerization of the monomer in bulk has only recently been made successful. Bulk polymerization, which is generally considered to be by polymerization in liquid phase in the absence of solvents and diluents, produces products which are possessed of certain properties that are quite superior to those of polymers produced from identical monomers by other methods. Superior heat resistance is one such property.

Despite the advantages of the product, the difficulties of the method were very great, so that other methods were exclusively adopted in industry until Sans developed a successful process on behalf of the assignee of this invention. Among the difficulties of the bulk process, in connection with vinyl chloride thermoplasts, are the facts that the monomer is a gas at atmospheric temperature, that it has to be liquified in an autoclave, that it tends to develop degraded aggregates, and that it tends to adhere to the wall of the autoclave as an insulating crust. The polymerization reaction is exothermic and the existence of such crust inhibits the production of a satisfactory product, indicating the use of specially designed scraper agitators driven from a motor outside the autoclave, thus requiring that a shaft penetrate the autoclave wall, an undesirable construction in pressure vessels.

It has been established that during the bulk polymerization for the production of the thermoplasts of the type indicated all the material undergoing polymerization takes a powdery form very rapidly. For example, working with polyvinyl chloride, the powder state is attained when only about 25% of the mass is actually polymerized. That state is not conducive to good heat transference or to the uniform discharge of excess heat of reaction, and even the best agitators and mixers produce results that are imperfect.

These problems do not arise in the manufacture of thermoplasts that are soluble in the monomer, whereas this invention is particularly useful in the problems arising about vinyl and vinylidene halides, fluoro and chlorofluoroethylene, the polymers or copolymers of which are insoluble in the monomers or monomeric mixtures. As the degree of polymerization and the quality of the product depend upon the temperature of polymerization, as the temperature of the exothermic reaction must be controlled to produce a useful and reasonably uniform product, and as the control of the temperature takes place externally by cooling the wall of the autoclave, creating zones of different temperature in the polymerization mass, the process is still beset by difficulties and irregularities in process and product.

This invention is an improvement on the known process of bulk polymerization. It has for objects to produce more uniformly polymerized products, to eliminate or greatly reduce the formation of aggregates in the polymerization mass, to simplify and improve the control of temperature, to eliminate the penetration of the autoclave wall by agitator shafts, to produce and improve the granulation of the product in the autoclave and to produce a larger quantity of the granules in selected sizes, and to improve the imperfections above noted and to improve the process of bulk polymerization in other ways, to be more fully hereinaftetr set forth.

The new method abandons the agitation of the mass within the autoclave and proceeds by the fluidification of the solid polymer as it is formed in the nonsolvent monomer. Fluidification is to be understood as putting all the solid particles of polymer into a state of activity which resembles fluidity or liquidity. As an example, consider a mass composed of powder placed in a receptacle. If one drops a heavy object on the mass, for instance a heavy lead ball, the ball makes a shallow dent in the surface of the mass of powder, but has little other effect, but if the powder is activated by insufflation by a gas, or by violent internal agitation, the same ball will sink deep into the powder and may even pass through and strike the bottom of the receptacle. That state of solid particles is called fluidification and it is an accomplishment of this invention that the fluidification of the polymer has been accomplished in situ as it is formed.

Because the operation occurs in a sealed autoclave, which eliminates the possibility of using insufflation to establish the fluidified state, and because even the best agitators are only partly successful in maintaining an even dispersal of the heat of reaction and do not produce this state, it has been necessary to invent novel means to accomplish fluidification during polymerization within an autoclave.

The invention is accomplished with preferred results by polymerizing the vinyl monomer in bulk while bringing the polymer, as it forms, into a fluidified state, maintaining it in that state during the continuation of the polymerization, and terminating the polymerization when about 75–85% of the monomer has been polymerized. The advantages of this process, described in detail hereinafter, are substantial and numerous.

In one practical form of the invention, the polymerization mass is fluidified by inclusion within a horizontal, rotary, cylindrical autoclave containing one to two lines of rollers extending the length of the cylinder which progress through the mass as the autoclave turns around its axis. The rollers may be balls, or cylinders, or wheels, or bars composed of materials inert to monomer and polymer, such as stainless steel, as examples.

It is not sufficient to operate the autoclave as though it were a ball mill as such means are ineffective. It is our discovery that the speed of rotation and the density, size and number of the rollers have an important bearing on the success of the new process. The speed of rotation communicated to the apparatus has an important influence on the fluidification of the reaction product; to secure a satisfactory result, the autoclave must be rotated within a limited range of speed. The preferred speed of rotation is between 20 and 30 meters per min. That range of speed is a function of the diameter of the apparatus, or, in other words, an important thing is the tangential velocity of the periphery of the internal cylindrical wall of the autoclave, which we shall call the peripheral or cirumerential velocity. If that speed is too low, the polymer remains in a compact condition and is not fluidified, the thermal exchanges through the wall of the autoclave are irregular and poor and the results are unfavorable. For autoclaves of industrial type having a diameter of 50–100 cm., good fluidification of a substantial part of the polymer begins at a peripheral speed of about 18 meters per min. and as the speed is increased, the whole polymer is rapidly fluidified, but if the speed is increased to the order of about 100 m./min., a certain quantity of the polymers tends to adhere on the wall, eventually forming a cylinderical lining more or less compact, and if the speed is still further increased, for instance, to 200 m./min., all the polymer in the autoclave will be packed against the wall of the autoclave by centrifugal force. Consequently, the fluidified state is maintained satisfactorily only at speeds between about 20 and a little less than 100 m./min., but from the standpoint of good practice, the low speeds in that range (20–30) should be employed because they give good results, do not needlessly increase the power consumed by the apparatus, and do not needlessly increase the wear and strain on the apparatus.

At the beginning of the polymerization, there is little or no settled polymer in the autoclave, what there is being suspended in the liquid monomer, and at that state, when the whole mass is still liquid, there is no particular difficulty in properly cooling the mass and it is not necessary to rotate the autoclave at any particular speed, and during that preliminary stage, a very slow speed of rotation is satisfactory, but care should be taken to attain the essential speed before precipitation of polymers against the wall begins.

It is a part of this invention to have established that the dimensions, the density, and the number of the inert rollers have an influence on the results obtained, and these factors should be chosen so that these rollers are constantly in contact with the wall, and preferably extend from end to end in a line in which each has contact with others. We have discovered that rollers that are too light, either by reason of too small diameter or of too small density will occasionally depart from contact with the wall during rotation and have a tendency to be carried inward toward the axis of the cylinder. That phenomenon is undesirable and to be avoided and can be overcome by increasing the weight of the rollers, which generally speaking are balls, either by increasing their weight or their density. However, rollers of very small diameter are not desirable, being inefficient compared to those of greater diameter.

In order to obtain a suitable working of the whole surface of the autoclave, which is advantageous especially in those of large size, for instance, having a diameter of a meter, it is advantageous to use balls of 10 to 12 or even 15 cm. diameter and of a density at least 6; lead balls or iron balls or hollow inert balls of any material filled with lead or other heavy material. The rollers need not be of equal diameter, but may be of different size and weight so long as they will follow the wall and not wander inwardly. A single line of balls is sufficient, but it is advantageous to supply one or two extra, or even a second line of balls, to provide and compensate for the movement of the balls out of the line of the lowest generatrix of the cylinder. It is not advantageous to use more than two lines of rollers and it is undesirable to supply the autoclave with plural layers of balls as in ball mill practice.

The polymerization need not be changed from existing good bulk practice, as the same proportions, catalysts, pressures, and temperatures are useful in combination with the present invention, and when so used the products produced are superior. For instance, catalysts such as benzoyl peroxide and other organic peroxides are useful in prior art proportions.

In a modification of the invention the process can be carried out as hereinabove set forth, but in the presence of a small quantity of a diluent which should be at least partially miscible with the monomer, but not a solvent or plasticizer for the polymer. Generally speaking up to 5% of such a diluent may be used. Examples of such diluents are alcohols, particularly methyl, and hydrocarbons such as propane, butane and petroleum ether. The advantage of this modification of the process is that it tends to produce finer granules in the polymer.

The following examples illustrate the application of the invention.

*Example 1*

In order to polymerize vinyl chloride in mass, a cylindrical autoclave made of stainless steel is arranged with its axis horizontal and with means to drive it at the ranges of speed hereinabove indicated. The autoclave used in this particular example was of approximately 140 liters capacity and included a cylindrical body 600 mm. long and 500 mm. in interior diameter. About this cylindrical body was a jacket through which water could be circulated to regulate the temperature. The ends of the autoclave are mouned on supports in bearings. At the middle of the autoclave is a taphole having an internal surface conforming to the curvature of the cylinder so that the interior surface of the autoclave has no irregularities. The autoclave is charged and discharged through the taphole. On the plates forming the ends of the autoclave are carried control apparatus such as a thermometer and monometer, as well as valves serving for the introduction of the monomer and the relief of gas.

Additionally there was placed in this autoclave six balls composed of hollow spheres of stainless steel filled with lead filings. These balls were 90 mm. in diameter and weighed 3 kgms. They were assembled in a continuous line along the lower generatrix of the cylinder. A seventh was added, similar in construction to the six. Thereafter 50 kgms. of vinyl chloride were admitted in liquid phase, containing .08% benzoyl peroxide and .02% of trisodium phosphate, these percentages being based on weight with respect to the weight of the monomer.

The autoclave was closed and water was circulated through the jacket. The apparatus was rotated at a tangential linear velocity of 33 m. per minute, this speed being calculated for the interior surface of the autoclave cylinder. The temperature is maintained at 58° C. without any difficulty, the polymerization being thermally controllable at every instant by the simple regulation of the circulation of water through the jacket.

At the end of 17 hrs. the autoclave was stopped and the monomer was distilled out by the circulation of water at 40° C. through the jacket. Previously the water had been admitted at reservoir temperature, about 20° C. When the pressure fell to zero, as indicated by the monometer, the autoclave was opened. 40 kgms. of polymer were obtained in the form of a fine white powder corresponding to a yield of 80%, corresponding to an hourly yield of polymer of about 4.7%. This resin had a K. Wert of 64.3 and a content of low polymers of 5.1%. It was in grain so fine that 61% passed through an Afnor screen of type 26. The stability of the resin was 12½ minutes. The stability test is determined by the length of time at the end of which a test piece of the resin, containing 1.5% of diabasic lead stearate, laminated 10 min. at 160° C. and thereafter subjected to pressure at 200° C., show patent signs of decomposition. This is a standard test and need not be described in detail.

*Example 2*

Employing the same horizontal autoclave rotating as in Example 1, we polymerized 50 kgms. of vinyl chloride in the presence of .04% of polymerization catalyst but with different conditions of tangential speed and in the presence of balls of different dimension and density, maintaining a temperature around 60° C. in all cases.

In the first of these tests we used, as in Example 1, stainless steel balls loaded with lead filings and being 90 mm. in diameter weighing 3 kgms. and 7 in number. The polymerization was carried out, for each operation at respective speeds of 11, 22 and 33 meters per min. The hourly rate of polymerization was about equal in all cases, approximately 6 to 6½% per hr. and the products were approximately alike as concerned the K. Wert, the content of low polymers, and stability, all of which were similar to the product of Example 1.

On the other hand, the resins resulting from these three experiments were of quite different granulation. The percentages of powder passing through an Afnor screen model 26 (42 mesh) being respectively 50, 75 and 80%, these sizes being respectively related to the tangential velocities 11 meters per min., 22 meters per min. and 33 meters per min., respectively.

In another case, adopting a same tangential speed of 10 meters per min. and a temperature of 60° C. we utilized successively lead bullets 18 mm. in diameter and wooden balls coated with lead of 100 mm. in diameter. With the lead balls of 18 mm. diameter and a charge of 20 kgms. of polymerization mass, the conduct of the operation was very difficult and the balls were found to have dispersed themselves throughout the whole polymerization mass instead of remaining in contact with the lowest generatrix of the cylinder, and the temperature could not be maintained at 60°. When the autoclave was opened, a large number of hard crusts had been formed on the walls of the autoclave and many aggregates more or less hard were found in the polymer powder.

With the leaded wooden balls of 100 mm. diameter, which had a density of 2.92, there was produced in 24 hrs. a yield of 87% corresponding to an hourly rate of polymerization of only 3.6%. Only 58% of the resin passed through the Afnor screen type 26. The proportion of crusts and aggregates formed during the polymerization was about 10% of the weight of the polymer, whereas substantially no crusts or aggregates were found when the rollers had a density equal to at least 6.5%.

*Example 3*

In an autoclave of 2.8 cu. meters internal capacity made of ordinary steel but of the same mechanical construction as that described in Example 1, of which the internal diameter is 90 centimeters, 2 lines of steel rollers loaded with lead having a diameter of 100 mm. and a density of 9 were placed, there being 69 balls in all. 1000 kgms. of vinyl chloride and .02% of catalyst, based on the weight of the monomer, were enclosed in the autoclave. The autoclave was put into rotation at a speed of 9 to 10 turns per min., which is equivalent to a tangential velocity between 25.5 and 28 meters per min. There was no difficulty in maintaining the temperature in the neighborhood of 60° C. by circulation of water in the jacket of the autoclave.

At the end of 16½ hrs. the operation was terminated. After the degassing step, the pressure having been brought to zero, the autoclave was opened and the polymer was found to be present as a very fine powder. In this way there were recovered 780 kgms. of polyvinyl chloride corresponding to an hourly rate of polymerization of 4.7%. The resin had a K. Wert of 63.3 a content of low polymers of 4.2% and a stability between 15 and 17 min. at 200° C., stability being determined as above set forth. 65% of the polymer passed through the Afnor type 26 screen and the content of crusts and aggregates formed during the polymerization was less than 0.5%.

*Example 4*

In a horizontal autoclave described in Example 1 containing 7 stainless steel balls loaded with lead there were introduced 50 kgms. of vinyl chloride containing .04% of catalyst. The autoclave was turned at a circumferential speed of 22 m./min. and cooling maintained the temperature around 57° C. A yield of 70% was obtained in 11½ hrs. corresponding to a polymerization rate slightly above 6%, a polymer of high K. Wert, equal to 65.8 of which the content of low polymers was less than 4%.

In operating under the same conditions, but at a temperature of 65° instead of 57° after 8 hours and 50 min. corresponding to an hourly rate of polymerization on the order of 7% the K. Wert of the polymer was relatively low, equal to 59.3, and of which the content of low polymers reached 5.7%. During the operation, in spite of the adoption of a temperature high enough to produce a polymer of relatively low K. Wert, no violence was observed in the polymerization and the temperature was maintained without difficulty. This is believed to be the reason why the content of low polymers remained reasonable, being not far from that (6%) of the polymer obtained at 57° C.

*Example 5*

Into the autoclave of Example 1 were put 47.5 kgms. of vinyl chloride and 2.5 kgms. of petroleum ether, which is 5% of the weight of the monomer. .04% of catalyst were added and polymerization was carried out as above described, keeping the temperature at about 60° and the tangential speed at 22 meters per min. At the end of 15 hours and 15 min., there was obtained a very fine resin in a yield of 72%, indicating an hourly rate of polymerization of 4.7%. The K. Wert was equal to 61.9 and the content of low polymers was 5.2%. This resin passed for 83% through the Afnor screen type 26. No crusts had formed on the wall of the autoclave and no aggregates were found in the polymer. This had the advantage that the apparatus did not need cleaning and could be put to use again immediately. The petroleum ether was easily removed during the degassing and as the polymer was withdrawn from the autoclave, the resin was stable under pressure from 10–12½ min. at 200° C.

The process presents numerous advantages with respect to other processes of polymerization in mass. A major advantage is that substantially no aggregates are formed, practically all the product issuing from the autoclave at the end of the process being fine enough to pass through a screen having 30 mesh to the inch, an example of which is Afnor type 26, and of this product a high proportion, on the order of at least 60% and generally more, passes through a 60 mesh screen without reduction in size.

Another advantage is that since no crusts form on the walls, the autoclave need not be cleaned at the end of the polymerization. This reduces the cost of the process and the investment in apparatus and increases the utility, productivity and life of each autoclave. It is astonishing that balls rolling in a line on the bottom of an autoclave should prevent the formation of crusts, as it would naturally be presumed that they would tend to compress minute particles of polymer against the wall and thus build up crusts by pressure. In this regard, it should be remembered that after about 25% of polymerization, 75% of the charge still being monomeric, the operation is not proceeding in a liquid state but in a powder state.

Another advantage is that the process permits an easier and more accurate control of temperature, great precision of control being possible. It is an astonishing fact that the rolling of a line or two of balls along the surface of the rotating autoclave permits such an improved heat exchange with the cooling system that the interior temperature of the autoclave can be regulated to, and maintained within, a selected range of a few degrees, and this assists in producing a very homogeneous product having chain lengths of greater uniformity than could previously be obtained, at least by bulk methods. Furthermore, this ability to select a particular temperature of polymerization permits the operator to produce a polymer of a selected, that is higher or lower, degree of polymerization. The more the temperature is raised, the lower the degree of polymerization. In general, the degree of polymerization will be referred to in this specification as the K. Wert (K. W.) as defined by Fikentscher: Cellulose Chemie, 1932, tome 13. Practically all the users of polyvinyl-chloride ask for products of which the K. W. is within the range 55–70. It is easy to produce such products by the process of the invention as it is possible to control the K. W. of the product within a much smaller range than 55–70.

In carrying out the invention, it is very rare that one would wish to carry it to completion (100%) because the last stages of the polymerization produce low polymers, so that if a low percentage of low polymers is desired, the operation should be terminated before completion. Preferred results are obtained in terminating polymerization between 75 and 85% of total.

Another advantage resides in the fact that the rate of polymerization is higher than in prior processes, which reduces the time of such operations. As indicated in the preceding examples, the operations are always less than 24 hrs. and frequently 15 to 16 hrs.

It is also to be considered that in the horizontal autoclave of the invention every vertical section of the apparatus acts like the neighbouring sections, that is to say that if you increase the length of the apparatus without changing its diameter, you augment its productive capacity without changing the characteristics of the apparatus as to heat exchange, so that the productivity can be increased without changing the conditions of the process by the simple expedient of using a longer autoclave of the same diameter.

In the following example it is shown how the process may be applied to the manufacture of a copolymer.

*Example 6*

In a horizontal autoclave similar to that described in the Example 1 but in steel internally lined with nickel, containing seven nickel hollow balls filled with lead and having a diameter of 9 c/m, one replaced the air by nitrogen and then one introduced 2 K. of vinylidene chloride recently distilled, 50 K. of liquid vinyl chloride and 50 gr. of polymerization catalyst.

In view of eliminating any residual oxygen before starting the copolymerization, one has proceeded to a partial vaporization of the monomeric mixture contained in the autoclave. During this operation about 2 K. of vinylchloride were distilled out the autoclave.

The autoclave was then rotated at a tangential linear velocity of 22 m. per minute. The temperature was maintained at about 55° C. At the end of 24 hours one obtained a fine powder of which 60% passed through an Afnor screen No. 26. It was a copolymer containing approximately 92% vinylchloride and 8% vinylidene chloride.

The molecular weight of this copolymer was evaluated by the determination of the viscosity of a 1% solution of the product in cyclohexanone at 20° C. compared to the viscosity of the pure solvent at the same temperature, this relative viscosity was 2.

As many apparently widely different embodiments of the present invention may be made departing from the spirit and scope thereof, it is to be understood that the invention is not limited to the specific embodiments.

What is claimed is:

1. In the production of a solid polymer by bulk polymerization from a liquid monomer in which it is insoluble, and in which the polymerization proceeds until the polymerization mass has the appearance of a powder, but contains a substantial percentage of monomer capable of undergoing polymerization, the steps that comprise enclosing the monomer in a polymerization vessel with round objects capable of rolling along the bottom of said vessel but restricted in movement to the lower volume of said vessel, putting all the solid particles of polymer into a state of activity which resembles fluidity or liquidity, as the mass becomes powdery, by producing relative motion between the round objects and the bottom of the vessel to cause the round objects to move within, while being restricted in their motion to, the lower portion of the volume of the liquid-solid polymerization mass, and maintaining said state of the polymerization mass during the continuance of the polymerization.

2. The method of claim 1 in which the vessel is a right circular cylinder on a horizontal axis and is rotated about the horizontal axis and the round objects are arranged in one to two lines extending along the bottom thereof.

3. The method of claim 1 in which the monomer is a vinyl halide.

4. The method of claim 2 in which the monomer is one of the group consisting of vinyl chloride and vinylidene chloride, the rollers are of density at least 6, and the peripheral speed of the part of the vessel contacting the balls is between about 20 m./min. and a little below 100 m./min.

5. The method of claim 2 in which the monomer is one of the group consisting of vinyl chloride and vinylidene chloride, the rollers are balls of density at least 6, the peripheral speed of the part of the vessel contacting the balls is between about 20 m./min. and a little below 100 m./min., and the temperature of polymerization is not over 60° C.

6. The method of claim 2 in which the monomer is one of the group consisting of vinyl chloride and vinylidene chloride, the rollers are balls of density at least 6, the peripheral speed of the part of the vessel contacting the balls is between about 20 m./min. and a little below 100 m./min., the temperature of polymerization is not over 60° C., and the polymerization is arrested at about 75–85% of completion.

7. The method according to claim 3, in which the temperature of polymerization is maintained below 60° C., and polymerization is arrested at 75–85% of completion.

References Cited in the file of this patent

UNITED STATES PATENTS

| | | |
|---|---|---|
| 2,479,360 | Howard | Aug. 16, 1949 |
| 2,543,805 | Reinhardt | Mar. 6, 1951 |
| 2,580,277 | Boyd et al. | Dec. 25, 1951 |
| 2,600,695 | Sans | June 17, 1952 |

FOREIGN PATENTS

| | | |
|---|---|---|
| 606,116 | Great Britain | Aug. 6, 1948 |